United States Patent [19]
Miwa

[11] Patent Number: 5,058,927
[45] Date of Patent: Oct. 22, 1991

[54] FLUID COUPLING DEVICE

[75] Inventor: Yuji Miwa, Chita, Japan

[73] Assignee: Brother Kogyo Kabushiki Kaisha, Nagoya, Japan

[21] Appl. No.: 539,206

[22] Filed: Jun. 18, 1990

[30] Foreign Application Priority Data

Jun. 22, 1989 [JP] Japan .................. 1-73166[U]

[51] Int. Cl.$^5$ ............................................. F16L 17/10
[52] U.S. Cl. ......................................... 285/11; 285/14; 285/276
[58] Field of Search ................ 285/13, 14, 10, 11, 285/404, 276, 94

[56] References Cited

U.S. PATENT DOCUMENTS

| | | | |
|---|---|---|---|
| 1,994,169 | 3/1935 | Comins | 285/11 |
| 3,429,588 | 2/1969 | Nelson | 285/11 |
| 3,889,983 | 6/1975 | Freize | 285/13 |
| 3,957,294 | 5/1976 | Hoban | 285/14 X |
| 4,253,684 | 3/1981 | Tolbert | 285/404 X |

FOREIGN PATENT DOCUMENTS 166644 5/1988 Japan .
184941 6/1989 Japan .

Primary Examiner—Dave W. Arola
Attorney, Agent, or Firm—Oliff & Berridge

[57] ABSTRACT

A fluid coupling device of non-contact type having a stationary main coupling body and a rotary shaft rotatably supported through bearings to the coupling body and formed with an axial fluid passage extending along a length thereof. A minute space is provided at an end portion of the rotary shaft relative to the coupling body, and a pressure reduction chamber is defined beside the minute space for reducing a pressure of fluid leaking thereinto through the first minute space. A second minute space is provided between an outer peripheral surface of the rotary shaft and an inner peripheral surface of the coupling body. The second minute space is in fluid communication with the pressure reduction chamber and is applied with a pneumatic pressure for blocking the bearing against entry of the leaked fluid.

7 Claims, 3 Drawing Sheets

FLUID COUPLING DEVICE

BACKGROUND OF THE INVENTION

The present invention relates to a fluid coupling device, and more particularly, to a type thereof for introducing a fluid into a rotary member rotated at high speed from a stationary side. The fluid coupling device is particularly available for applying a machining liquid into a gun drill of a machine tool.

One conventional fluid coupling device is shown in FIG. 1, using a contact type mechanical sealing system. In the device, a rotary shaft 53 formed with an axial fluid passage 54 is journalled by a coupling body 51 having generally cylindrical shape through bearings 52. The rotary shaft 53 has one planar end at which one end of the fluid passage 54 is opened. One end of the coupling body 51 is provided with a side member 51A formed with a fluid inlet port 55. A seat ring 57 formed with an axial fluid passage 56 is positioned so as to provide fluid communication between the fluid passage 54 of the rotary shaft 53 and the fluid inlet port 55. The seat ring 57 is movable in axial direction thereof is unrotatable about its axis by a pin 58 fixedly secured to the side member 51A. A coil spring 59 is provided between the side member 51A and the seat ring 57 to urge the seat ring 57 toward the planar end of the rotary shaft 53 (leftwardly in FIG. 1).

A follower ring 60 is fixedly coupled to the planar end of the rotary shaft 53. Therefore, one end face of the seat ring 57 is urged to be pressed toward the follower ring 60. Consequently, the follower ring 60 is hermetically slidingly rotated relative to the end face of the seat ring 57 so as to hermetically maintain fluid passing through the fluid passages 56 and 54.

With the above described conventional arrangement, since fluid coupling is maintained by the mechanical seal system in which the follower ring 60 is in facial sliding contact with the end face of the seat ring 57, rotation speed of the rotary shaft 53 should be within a low level, otherwise frictional wearing may occur at the interfaces of the follower ring and the seat ring. If the applied fluid has high pressure or high temperature, high sealing performance at that portion must be required. To this effect, biasing force of the coil spring 59 must be increased. Accordingly, rotational speed of the rotation shaft 53 must be lowered to avoid frictional wearing. In summary, the mechanical seal type fluid coupling device is not available for the high speed rotation of the rotary shaft 53.

Further, the mechanical seal type fluid coupling device cannot perform idle rotation of the rotary shaft 53 so as to protect the sliding surfaces of the follower ring 60 and the seat ring 57. Moreover, a filter unit is required to avoid entry of the high hardness particles into the fluid passage when applying the liquid thereinto, otherwise the high hardness particles may damage the sliding surfaces.

Another type of conventional fluid coupling device is described in Japanese Utility Model Application (Kokai) No. 57-166644. This device is of non-contact type fluid coupling device as shown in FIG. 2, in which a minute hollow space or gap is defined between an inner peripheral surface of a coupling body 71 and an outer peripheral surface of a rotary shaft 72 rotatably extending through the coupling body 71 through bearings 75. The rotary shaft 72 is formed with an axial oil passage 74. The minute gap 73 has a radial gap of about 0.02 mm so as to seal a machining liquid passing through the oil passage 74.

In the conventional non-contact type fluid coupling device, the rotary shaft 72 can be rotated at high speed. However, if the applied fluid has high pressure, fluid leakage may occur, so that the leaked machining liquid may enter the bearings 75 to degrade their inherent function. Further, no system is provided in the conventional device for processing the leaked fluid. Therefore, aqueous machining liquid or pure water cannot be employed as the machining liquid passing through the fluid passage 74, since they may lead to corrosion of the device.

SUMMARY OF THE INVENTION

It is therefore, an object of the present invention to overcome the above described conventional drawbacks and disadvantages, and to provide an improved fluid coupling device capable of applying highly pressurized fluid without any leakage and irrespective of a kind of the fluid.

Another object of the invention is to provide such fluid coupling device capable of rotating a rotary shaft at high speed and of performing its idle rotation to thus performing intermittent fluid application into a fluid passage.

These and other objects of the invention will be attained by providing a fluid coupling device including a stationary main coupling body which has a cylindrical wall portion, a rotary shaft rotatably supported by the main coupling body through a bearing, the rotary shaft extending in the main coupling body and being formed with a fluid passage, a fluid being supplied from a fluid inlet of the main coupling body to the fluid passage, the rotary shaft having an outer peripheral surface and having a rear end at which a rear end of the fluid passage is opened, and the main coupling body having an inner peripheral surface, the device comprising the inner peripheral surface of the main coupling body, defining a cavity therein, having first, second and third internal segments or portions arranged in order from the rear end thereof, and the outer peripheral surface of the rotary shaft at its rear end portion and the first internal portion defining a first minute space therebetween in communication with the fluid inlet, the outer peripheral surface of the rotary shaft and the second internal portion of the main coupling body defining a pressure reduction chamber in fluid communication with the first minute space, the wall portion of the main coupling body being formed with a drain hole through a thickness thereof and in fluid communication with the pressure reduction chamber, the outer peripheral surface of the rotary shaft and the third internal portion defining a second minute space in communication with the pressure reduction chamber, the second minute space being positioned between the pressure reduction chamber and the bearing, and the wall portion being formed with a pneumatic pressure inlet through the thickness thereof and in fluid communication with the second minute space.

A cross-sectional area of the first minute space is greatly smaller than that of the pressure reduction chamber. Therefore, the fluid leaking into the pressure reduction chamber through the first minute space is subjected to pressure reduction which pressure level is greatly lower than the applied pressure of the fluid passing through the fluid passage. Since the second minute pressure is applied with the pneumatic pressure, and which pressure level is much greater than the reduced pressure of the fluid in the pressure reduction chamber, the fluid in the pressure reduction chamber can be discharged outside through the drain hole without advancing into the bearing through the second minute space.

DETAILED DESCRIPTION OF THE PREFERRED EMBODIMENTS

Figure 1:
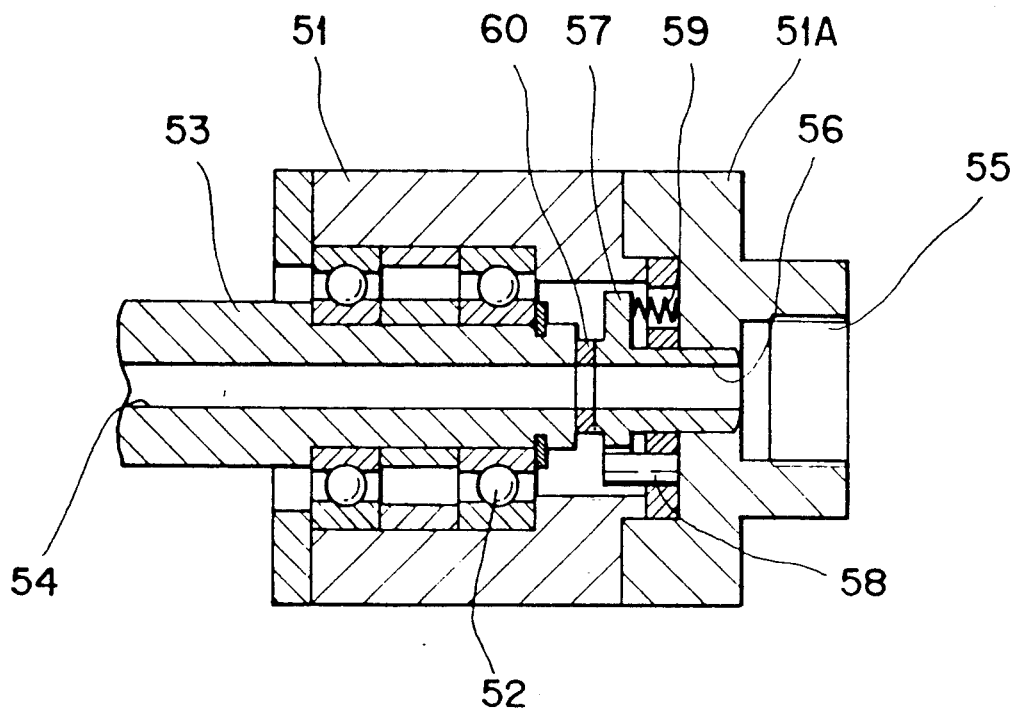
FIG. 1 is a cross-sectional view showing a conventional contact type fluid coupling device.
Figure 2:
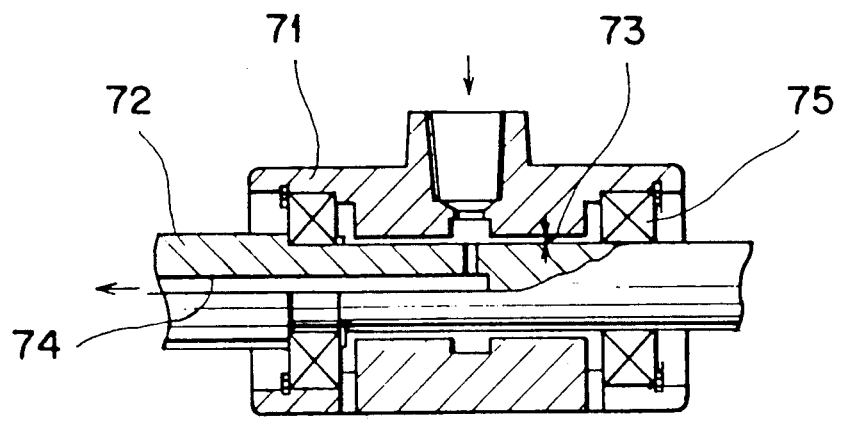
FIG. 2 is a cross-sectional view showing a conventional non-contact type fluid coupling device.
Figure 3:
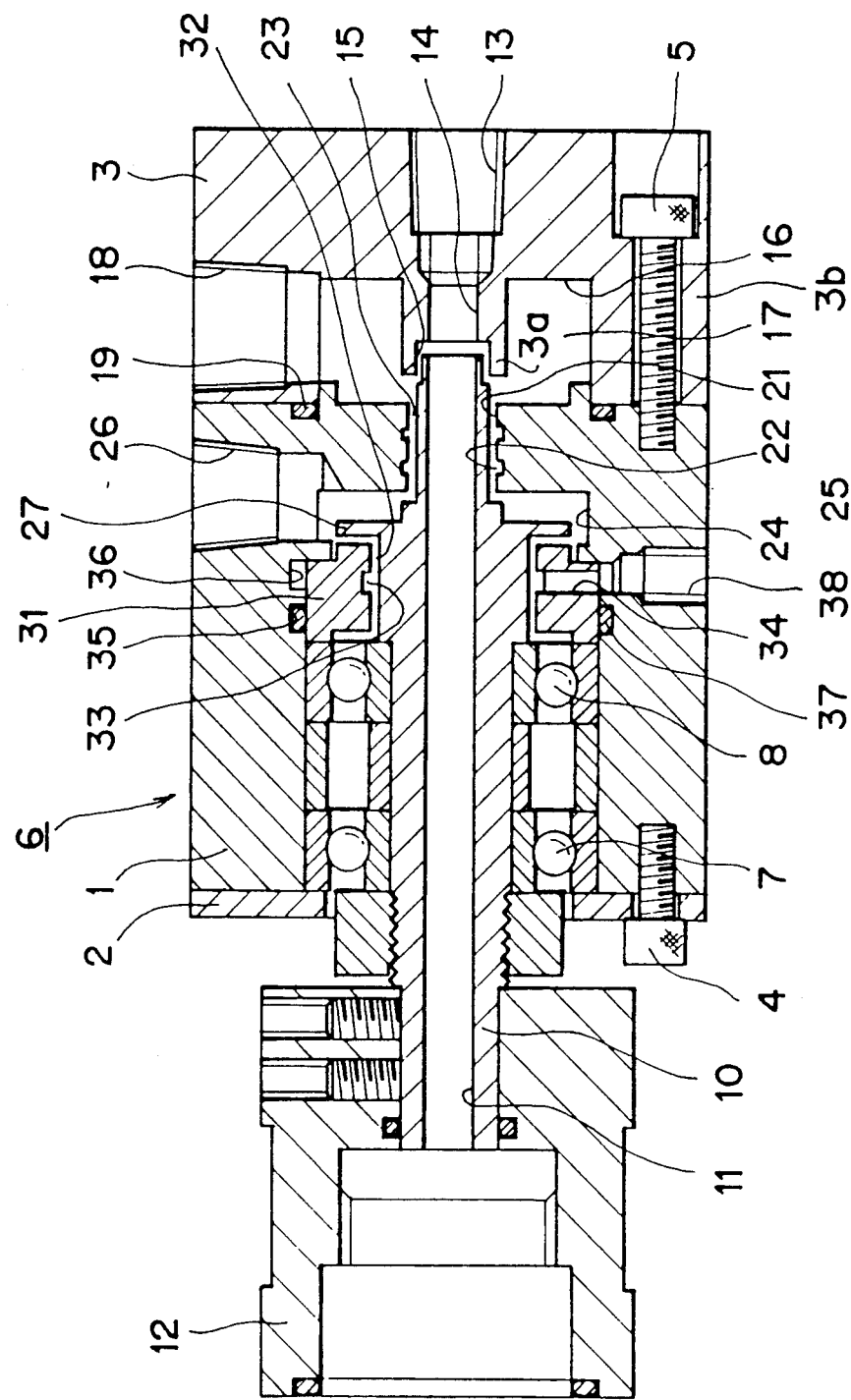
FIG. 3 is a cross-sectional view showing a fluid coupling device according to a first embodiment of the present invention.

A fluid coupling device according to a first embodiment of this invention will be described with reference to FIG. 3. The fluid coupling body generally includes a main coupling body 6 and a rotary shaft 10 rotatably supported by the main coupling body 6 through bearings 7 and 8. The main coupling body 6 includes a cylindrical body 1, a front disc member 2 fixed to a front end of the body 1 by a bolt 4 and a cup shaped rear body 3 fixed to a rear end of the body 1 by a bolt 5. The rear body 3 has an outer annular projection 3b through which the bolt 5 extends. The rotary shaft 10 is formed with an axial fluid passage 11 extending along a length thereof and opened at both ends thereof. A front end of the rotary shaft 10 is coupled to an adapter 12 rotatable integral with the shaft 10.

A rear end portion of the rear body 3 is formed with a highly pressurized fluid inlet port 13 at a radially central portion thereof, and a fluid passage 14 in communication with the inlet port 13 is also formed in the rear body 3. The fluid passage 14 is opened at a front end face of the rear body 3. The front end portion of the rear body 3 is provided with a sleeve portion 3a extending frontwardly through which the fluid passage 14 also extends. Further, a rear end portion of the rotary shaft 10 is positioned within the sleeve portion 3a, so that the highly pressurized fluid can be introduced into the fluid passage 11 of the rotary shaft 10.

The rotary shaft 10 has a large outer diameter portion at its front side and a small outer diameter portion at its rear side. The small outer diameter portion is inserted into the sleeve portion 3a which is one of a number of internal segments or portions that define a cavity in the main coupling body 6". Here, the outer diameter of the small outer diameter portion of the rotary shaft 10 is slightly smaller than an inner diameter of the sleeve portion 3a of the rear body 3, so that a minute annular space 15 is defined therebetween (non contact mode is maintained between the rotary shaft 10 and the rear body 3). This minute space can be referred to as "a first minute space".

The outer annular projection 3b defines another internal segment or portion of the cavity and with the inner sleeve member 3a of the rear body 3 defines an annular groove 16. This annular groove 16 and a rear end face of the cylindrical body 1 define a first pressure reduction chamber 17 in fluid communication with the first minute space 15. Further, the outer annular projection 3b is formed with a radial drain hole 18 in fluid communication with the first pressure reduction chamber 17 for discharging fluid toward outside. An O-ring 19 is interposed between the front end face of the rear body 3, i.e., the front end face of the outer annular projection 3b and the rear end face of the cylindrical body 1.

The cylindrical body 1 has a large inner diameter portion at its front side and a small inner diameter portion at its rear side, the latter being a bore 21 which constitutes a further internal portion of the cavity in the main coupling body 6. The small outer diameter portion of the rotary shaft 10 extends through the bore 21 of the cylindrical body 1. The outer diameter of the small outer diameter portion of the rotary shaft 10 is slightly smaller than an inner diameter of the bore 21, so that a minute hollow space 23 is provided. The shaft 10 and the bore 21 are maintained in non-contact fashion. Further, in an inner peripheral surface of the bore 21, a plurality of annular grooves 22 are formed so as to constitute a labyrinth seal. Further, an annular groove 24, defining a fourth internal segment or portion of the cavity in the main coupling body 6, is formed at a rearmost position of the large inner diameter portion of the cylindrical body 1. The annular groove 24 is in fluid communication with the minute annular space 23 and can provide a second pressure reduction chamber 25. A radial drain hole 26 is formed at the cylindrical body 1 in communication with the second pressure reduction chamber 25. A flanged portion 27 is provided at the rotary shaft 10 and at a position within the second pressure reduction chamber 25. The flanged portion 27 is also out of contact with the cylindrical body 1.

An annular member 31 is provided between the rear bearing 8 and the flanged portion 27. The annular member 31 is fixedly secured to the inner peripheral surface of the cylindrical body 1. Further, an annular minute space 32 is defined between an inner peripheral surface of the annular member 31, constituting an additional internal segment or portion of the cavity, and the outer peripheral surface of the rotary shaft 10. This annular space 32 is referred to as "a second minute space 32".

The inner peripheral surface of the annular member 31 is formed with an annular groove 33, and a radial hole 34 in communication with the annular groove 33 is formed in the annular member 31. On the other hand, two annular grooves 35 and 36 are formed at an inner peripheral surface of the cylindrical body 1 at a position in contact with the annular member 31. One of the grooves 35 assembles therein an O-ring 37 for hermetical sealing between the annular member 31 and the cylindrical body 1, whereas the other groove 36 is in fluid communication with the radial hole 34 of the annular member 31. Further, a radial air inlet port 38 in communication with the groove 36 is formed in the cylindrical body 1 so as to apply compressed air to the second minute space 32. In summary, the air inlet port 38, the annular groove 36 formed in the cylindrical body 1, and the radial hole 34 and the annular groove 33 formed in the annular member 31 constitute a pneumatic passage for applying pneumatic pressure to the second minute space 32.

In operation, highly pressurized fluid such as compressed water is applied first to the fluid inlet port 13 formed at the rear end portion of the rear body 3. In this case, compressed air is simultaneously applied to the air inlet port 38. The pressurized fluid is then passed through the fluid passage 14 of the rear body 3 and the fluid passage 11 in the rotary shaft 10 rotated at high speed, and then reaches the adapter 12. A part of the pressurized fluid may be leaked into the first pressure reduction chamber 17 through the first minute space 15. In this case, since a cross-sectional area of the first pressure reduction chamber 17 is far greater than that of the first minute space 15, pressure of the pressurized fluid in the chamber 17 is much smaller than that of the fluid passing through the passages 14 and 11. The fluid undergoing the pressure reduction can be discharged outside through the drain hole 18.

Further, the pressure-reduced fluid in the first pressure reduction chamber 17 is also leaked into the second pressure reduction chamber 25 through the minute space 23 constituting the labyrinth seal. In this case, also, since a cross-sectional area of the second pressure reduction chamber 25 is far greater than that of the minute space 23, the fluid leaking into the chamber 25 is subjected to pressure reduction. The thus leaking fluid is discharged outside through the drain hole 26. During rotation phase of the rotary shaft 10, the fluid within the second pressure reduction chamber 25 can be subjected to directional force by the flanged portion 27, so that the fluid can be easily directed to the drain hole 26.

On the other hand, compressed air supplied from the air inlet port 38 is filled in the groove 33 and the second minute space 32, and is ejected toward the second pressure reduction chamber 25. Since the fluid pressure within the second pressure reduction chamber 25 is sufficiently low, the pneumatic pressure is sufficiently higher than the fluid pressure. Accordingly, the fluid within the second pressure reduction chamber 25 cannot be entered into the bearing 8.

Figure 4:
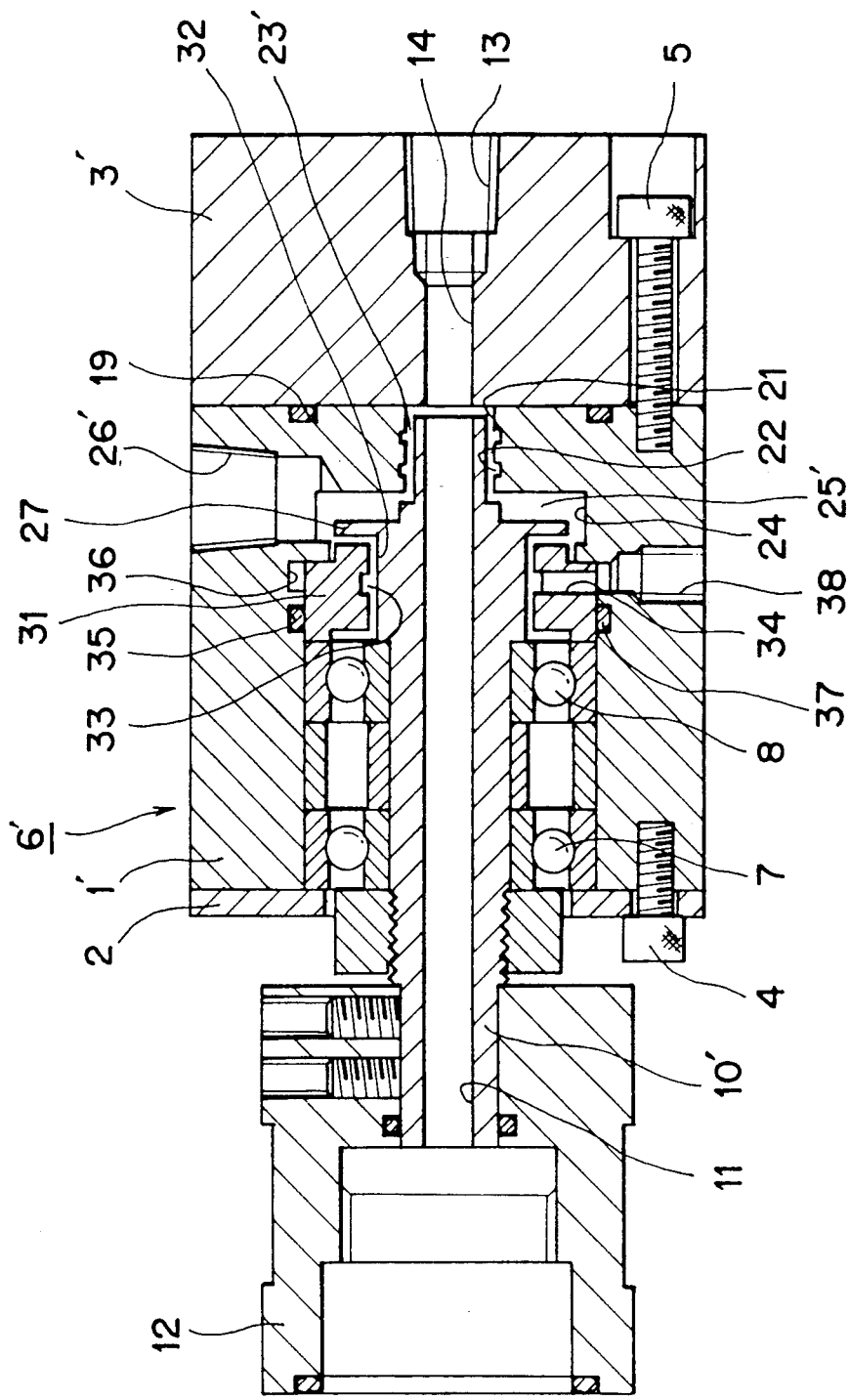
FIG. 4 is a cross-sectional view showing a fluid coupling device according to a second embodiment of this invention.

A fluid coupling device according to a second embodiment of this invention will next be described with reference to FIG. 4, wherein like parts and components are designated by the same reference numerals and characters as those shown in FIG. 3. In the first embodiment, two minute spaces 15 and 32 are provided for sealing highly pressurized fluid passing through the fluid passages 14 and 11, and two pressure reduction chambers 17 and 25 are provided for reducing the pressure of the fluid leaking thereinto through the minute spaces. In other words, multiple a pressure reducing system is provided in the first embodiment. With such structure, the fluid having extremely high fluid pressure such as about 100 Hg can be supplied to the adapter 12 without any fluid leakage into the bearing portion 8. On the other hand, only a single stage of pressure reduction system is available when the fluid pressure is not so high. The second embodiment concerns the single stage pressure reduction system in the fluid coupling device.

More specifically, the second embodiment does not provide the outer annular projection 3b, that is one of the internal segments or portions of the cavity, and the inner central sleeve portion 3a, that is another of the internal segments or portions of the cavity, at the rear body 3. Instead, a rear body 3' has a flat front surface with which a flat rear surface of a cylindrical body 1' is in facial contact through an O-ring 19. Accordingly, the "first minute space 15" and the first pressure reduction chamber 17 shown in the first embodiment are dispensed with.

In the second embodiment, a minute space 23', having a labyrinth arrangement, is defined between a hole 21 of the cylindrical body 1' and an outer peripheral surface of a small diameter portion of a rotary shaft 10'. This minute space 23' functions as the "first minute space" for sealing the pressurized fluid passing through fluid passages 14 and 11. A single pressure reduction chamber 25' (which is referred to as the second pressure reduction chamber in the first embodiment) is provided for reducing the pressure of the fluid leaking thereinto through the minute space 23'. A second minute space 32 and associates structure are identical with those of the first embodiment, and therefore, further description is negligible.

In view of the foregoing, according to the present invention, pressurized fluid passing through the fluid passages is hermetically sealed by the first minute spaces 15, 23, 23' and a part of the fluid leaking through the space is subjected to pressure reduction by the pressure reduction chamber(s). The fluid is further sealed by the pneumatic pressure applied to the second minute space 32. Accordingly, highly pressurized fluid can be sealed in non-contact fashion, and the bearing 8 is blocked by the non-contact type fluid coupling system. Consequently, the rotary shaft can be rotated at high speed irrespective of a kind of the fluid, and irrespective of pressure value thereof. Further, idle rotation of the rotary shaft can be performed because of non-contact mode fluid coupling, and therefore, intermittent fluid application to the fluid passage is achievable. Moreover, fluid filtering unit is not required because of the non-contact mode.

While the invention has been described in detail and with reference to specific embodiments thereof, it would be apparent to those skilled in the art that various changes and modifications can be made therein without departing from the spirit and scope of the invention.

What is claimed is:

1. A fluid coupling device including a stationary main coupling body which has a cylindrical wall portion, means for retaining a rotary shaft to be rotatably supported in the main coupling body by at least one bearing, the rotary shaft extending through a cavity within the main coupling body and being formed with an internal fluid passage, a fluid being supplied from a fluid inlet in a first end of the main coupling body to a rear end of the fluid passage of the rotary shaft, the rotary shaft having an outer peripheral surface, and the main coupling body having an inner peripheral surface defining the cavity therein, the device comprising:

the inner peripheral surface of the main coupling body having first, second and third internal portions arranged in order from the first end thereof, a rear end portion of the outer peripheral surface of the rotary shaft and the first internal portion of the inner surface of the main coupling body defining a first minute space therebetween, said first minute space in communication with the fluid inlet in the first end of the main coupling body;

the outer peripheral surface of the rotary shaft and the second internal portion of the main coupling body defining a pressure reduction chamber in fluid communication with the first minute space;

a drain hole formed through a wall portion of the main coupling body in fluid communication with the pressure reduction chamber;

the outer peripheral surface of the rotary shaft and the third internal portion of the main coupling body defining a second minute space in communication with the pressure reduction chamber, the second minute space being positioned between the pressure reduction chamber and the bearing; and a pneumatic pressure inlet formed through the wall portion of the main coupling body in fluid communication with the second minute space.

2. The fluid coupling device as claimed in claim 1, wherein the first internal portion is formed with a labyrinth groove.

3. The fluid coupling device as claimed in claim 1, wherein the rotary shaft is provided with a flanged portion extending radially outwardly at the pressure reduction chamber whereby a fluid leaking into the pressure reduction chamber is directed toward the drain hole.

4. The fluid coupling device as claimed in claim 1, wherein the main coupling body comprises a cylindrical body, and an annular body fixed within the cavity of the cylindrical body, the annular body having an inner peripheral surface for defining the third internal portion, an annular groove being formed in the inner peripheral surface of the annular body in communication with the second minute space, and a radial hole through the annular body providing the communication between an inner peripheral surface of the annular groove, through the cylindrical body, and the pneumatic pressure inlet.

5. The fluid coupling device as claimed in claim 1, wherein the inner peripheral surface of the main coupling body further includes a fourth internal portion positioned between the second and third internal portions, and a fifth internal portion positioned between the second and the fourth internal portions, and wherein a second pressure reduction chamber is defined between the outer peripheral surface of the rotary shaft and the fourth internal portion, and another minute space communicating with the first pressure reduction chamber and the second pressure reduction chamber is defined between the fifth internal portion and the outer peripheral surface of the rotary shaft, and a second drain hole is formed through the wall portion of the main coupling body in fluid communication with the second pressure reduction chamber.

6. The fluid coupling device as claimed in claim 5, wherein the fifth internal portion is formed with a labyrinth groove.

7. The fluid coupling device as claimed in claim 6, wherein the rotary shaft is provided with a flanged portion extending radially outwardly at the second pressure reduction chamber whereby a fluid leaking into the second pressure reduction chamber is directed toward the second another drain hole.

* * * * *